H. BLUMENBERG, Jr.
APPARATUS FOR RECOVERING POTASSIUM SALTS FROM CEMENT KILNS.
APPLICATION FILED MAR. 15, 1918.
1,296,462.
Patented Mar. 4, 1919.
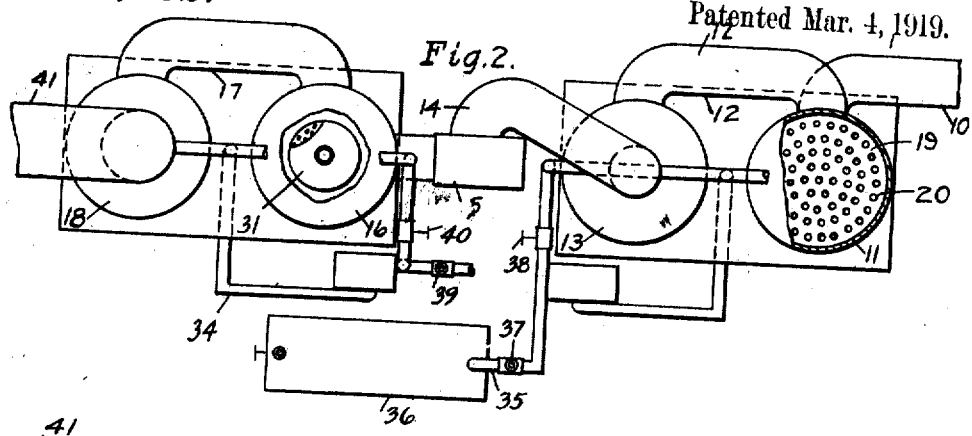
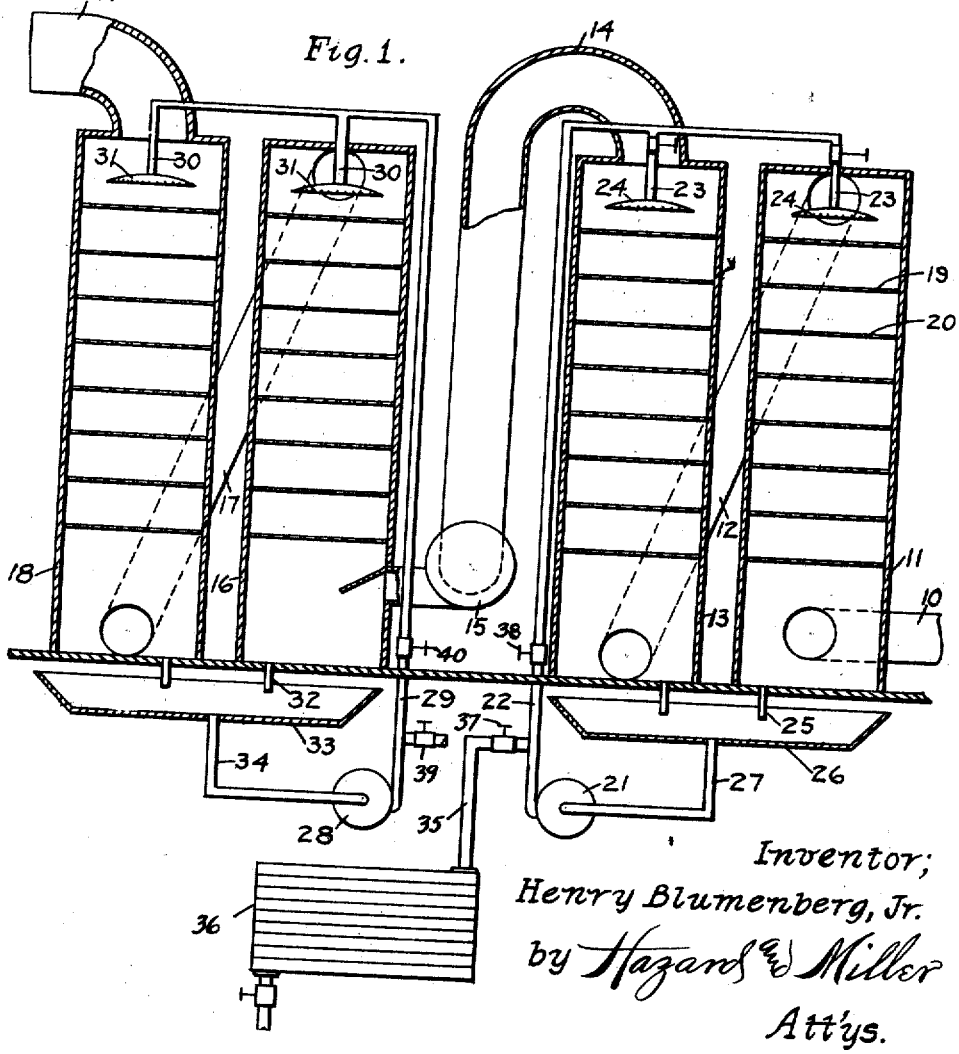
Inventor;
Henry Blumenberg, Jr.
by Hazard & Miller
Att'ys.

UNITED STATES PATENT OFFICE.

HENRY BLUMENBERG, JR., OF ORO GRANDE, CALIFORNIA.

APPARATUS FOR RECOVERING POTASSIUM SALTS FROM CEMENT-KILNS.

1,296,462.　　　　Specification of Letters Patent.　　Patented Mar. 4, 1919.

Application filed March 15, 1918.　Serial No. 222,766.

*To all whom it may concern:*

Be it known that I, HENRY BLUMENBERG, Jr., a citizen of the United States, residing at Oro Grande, in the county of San Bernardino and State of California, have invented new and useful Improvements in Apparatus for Recovering Potassium Salts from Cement-Kilns, of which the following is a specification.

My invention relates to an apparatus for recovering potassium compounds carried by hot gases, and especially gases from a cement kiln.

Potassium salts are produced nowadays as a by-product of cement kilns. Potassium containing materials, such as feldspar and the like are used in the manufacture of cement. The high temperature of the cement kilns volatilizes the potassium compounds which, mixed with cement dust, is carried off by the hot waste gases.

It is an object of the present invention to provide a simple yet efficient apparatus for recovering potassium compounds from said gases.

My invention consists in the combination and arrangement of the parts of the apparatus hereinafter described and claimed.

In the accompanying drawings which form a part of this specification, I have illustrated the apparatus, and in which:

Figure 1 is a vertical section thereof.

Fig. 2 is a top plan view thereof, some parts being shown as broken away, for purposes of clearer illustration.

10 indicates the upper end of a rotary cement kiln which terminates in the lower end of a precipitating tower 11. A conduit 12 conducts the gases from the upper end of tower 11 to the lower end of tower 13. A conduit 14 conducts the gases from tower 13 to a centrifugal fan or blower 15 which forces the same into the lower end of the precipitating tower 16. Another conduit 17 conducts the gases from the upper end of the tower 16 to the lower end of a tower 18. 41 is a gas outlet leading from the top of tower 18.

These towers may be of any suitable height. I have found that towers about 25 feet high give excellent results. They are circular in cross section, though they may be of any preferred shape and about 8 feet in diameter. Each tower is provided with a series of perforated baffle plates 19 horizontally arranged. These baffle plates are provided with perforations 20 of one-half inch in diameter and about one inch apart. A centrifugal pump 21 circulates a precipitating liquid which may be water or an aqueous mixture of compounds such as alkaline mixtures containing sodium, potassium, aluminum silicates, or a metal nitrate solution, or calcium sulfate and the like, suitable for collecting the cement dust and potassium compounds carried by the gases through pipe 22, leading to the top of the precipitating towers 11 and 13. Valved pipes 23 terminating in spray nozzles 24 in the tops of the towers 11 and 13 cause the liquid to flow down the towers and through the baffle plates in minute streams. The greater portion of the potassium compounds ($K_2O$) and practically all the cement dust of the hot gases are precipitated by the liquid and form a magma or slurry which is collected in the bottoms of the towers 11 and 13. Outlets 25 lead from the bottom of the towers 11 and 13 to a tank 26 communicating with pipe 27 with the centrifugal pump 21.

A centrifugal pump 28 supplies towers 16 and 18 with a precipitating liquid by means of pipe 29 and branch pipes 30 terminating in spray nozzles 31 in the tops of said towers. Outlets 32 at the bottom of said towers conduct the liquid and precipitated matter to a collecting tank 33 communicating with pipe 34 with pump 28. A pipe 35 leads from pipe 22 to a filter press 36. 37 is a valve in pipe 35 and 38 is a valve in pipe 22. A valved pipe 39 leads from pipe 29 which latter is provided with a valve 40.

In the operation of the apparatus, the hot gases coming from the cement kiln pass through the towers 11 and 13 in series and practically all of the cement dust is precipitated therein. The gases are cooled from a temperature of approximately 1200° F. to about 212° F. and saturated with steam. It should be noted that the centrifugal pump or blower 15 sucks the gas through the towers 11 and 13 and forces them through towers 16 and 18 where the remaining portion of the potassium compounds are precipitated by the water flowing down the towers 16 and 18. Probably one-quarter of the potassium compounds are carried in the gases over into the towers 16 and 18. The slurry collected in towers 11 and 13 is pumped to filter press 36 which separates the soluble potassium salts from the insoluble lime salts and the like. If desired, the slurry may be dried without separating potassium compounds therefrom. The major part of the dried slurry consists of calcium carbonate and calcium oxid which are valuable fertilizers, in conjunction with potassium compounds contained in the slurry.

The liquid derived from towers 16 and 18 is practically free from cement material, and it is unnecessary to filter press the same. The liquid may be pumped through a pipe 39 after closing valve 40 in pipe 29, to any convenient apparatus where the same is evaporated to dryness.

While I have shown only two precipitating towers 11 and 13 for collecting the cement dust and only two towers 16 and 18 for recovering the potassium not precipitated in the first two towers, it will be understood that any suitable number may be employed.

The advantage of the present apparatus over the one shown in my copending application for a process of recovering potassium and apparatus therefor Serial No. 214212, filed January 28th, 1918, is the provision of a precipitating tower extracting potassium compounds after the cement dust has been precipitated in the first set of towers 11 and 13, and a separate circulating system and pump keeping the concentrates which contain the potassium compounds, with practically no cement dust derived from towers 16 and 18, separate, thereby avoiding the expense of filter pressing all the concentrates.

The process described but not claimed in this application is made the subject of a copending application for process of recovering potassium compounds from waste gases of cement kilns and the like, filed March 15, 1918, Serial No. 222767.

I claim:

An apparatus for recovering potassium compounds carried in suspension by hot gases and mixed with other solids, comprising a precipitating chamber through which the gases are caused to circulate, means for causing a precipitating liquid to come in intimate contact with said gases in said chamber, whereby a large portion of the potassium compounds and substantially all the other solids are precipitated, means for separating potassium compounds from the precipitated matter, means for conducting the gases from said chamber into a second precipitating chamber, means for causing a precipitating liquid to come in intimate contact with said gases in said second chamber, whereby substantially all the remaining potassium compounds are precipitated, and means for conveying the potassium compound containing liquid from said second chamber independently of the liquid mixture collected in the first chamber.

In testimony whereof I have signed my name to this specification.

HENRY BLUMENBERG, Jr.